Feb. 27, 1968   R. E. HULL ET AL   3,371,261
POWER SUPPLY CONTROL USING GATE PULSE AMPLIFIERS
Filed Dec. 17, 1965   2 Sheets-Sheet 1

INVENTORS
Robert E. Hull and
Emil T. Schonholzer
BY
*A. Samuel Ohki*
ATTORNEY

United States Patent Office 3,371,261
Patented Feb. 27, 1968

3,371,261
POWER SUPPLY CONTROL USING GATE PULSE AMPLIFIERS
Robert E. Hull, Buffalo, and Emil T. Schonholzer, Depew, N.Y., assignors to Westinghouse Electric Corporation, Pittsburgh, Pa., a corporation of Pennsylvania
Filed Dec. 17, 1965, Ser. No. 514,462
8 Claims. (Cl. 321—5)

The present invention relates to power supply control apparatus and more particularly to such apparatus utilizing pulse amplifiers.

An AC to DC power supply converter circuit may be conveniently provided through the use of a bridge circuit employing controlled switching devices in the legs of the bridge. A semiconductor device which may advantageously be used in each of the legs of the power supply bridge is a silicon controlled rectifier (SCR). As is well known, the controlled rectifier may be rendered conductive by the application of a positive voltage to the gate electrode thereof with respect to the cathode electrode of the device. This will permit current to flow through the anode to the cathode circuit of the controlled rectifier. When the anode to cathode current drops below a predetermined hold value and the gating pulse has been removed, the device will return to its nonconductive state. If devices of this type are to be used in high power applications, it becomes necessary to apply gating pulses having fast rise times and sufficient peak power and pulse width to insure complete turn on of the controlled rectifier in the shortest possible time. These requirements are necessary in order to avoid excessive power dissipation in the devices and to provide simultaneous gating of units used in series and parallel combinations as necessary for high power applications. The waveform of the gating signal applied to the gate electrode of each of the controlled rectifiers thus becomes important from the standpoint of quickly turning on the device. It has been found necessary in order to avoid excessive power dissipation in the device that the gating pulse waveform reach approximately 70% of the maximum amplitude of the pulse within one microsecond from the beginning of the gating pulse. The gating pulse also must have a large enough amplitude and long enough time duration to insure the turning on and continued conduction of the controlled rectifier for the desired time interval. It is therefore essential that the gating pulse have a rapid rise time and high peak energy content in order to effect the proper gating on of the controlled rectifiers of the bridge array power supply.

A three-phase converter bridge circuit requires at least one controlled rectifier in each of the six legs thereof. It is necessary that two of the legs of the bridge be conducting at the same time in order to complete a circuit to the load circuit of the bridge. Having six legs to be gated in sequence, a pulse must be channeled to the appropriate leg once every 60 degrees based on the AC line frequency. In order to insure that two legs are conductive at the same time, each gating pulse must be held for more than 60 degrees (approximately 350 milliseconds for a 60 cycle per second input voltage) to insure the proper conduction of the controlled rectifiers of the bridge. The requirement for gating pulses of such a time duration and having a rapid rise time and relatively high energy content places excessive demands on the circuitry supplying the gating pulses to the controlled rectifiers.

It is, therefore, an object of the present invention to provide new and improved pulse amplifier circuitry for use in power supply control circuitry.

It is a further object of the present invention to provide new and improved pulse amplifier circuitry for use in power supply control circuitry capable of supplying gating pulses having a desired waveform.

It is a further object of the present invention to provide power supply control apparatus using control switching devices wherein the power dissipation is kept within safe limits when gating on these devices.

It is a further object to provide power supply control circuitry wherein gating pulses having predetermined characteristics are supplied to controlled switching devices so as to limit the energy dissipation therein.

It is a further object to provide power supply control circuitry using controlled switching devices in which a dual gating pulse technique is utilized to insure the conductivity of the devices during a given time interval.

Broadly, the above-cited objects are accomplished by providing power supply control apparatus utilizing pulse amplifiers capable of supplying gating pulses to controlled switching devices of the power supply apparatus, the gating pulse having a rapid rise time and high initial energy content to avoid excessive dissipation of energy in the controlled switching devices. Also, a dual gating technique is utilized in order to insure the conductivity of each of the controlled devices during a given time period to avoid the necessity of maintaining the pulse during the entire time interval and thereby to limit the power requirements of circuit components.

These and other advantages and objects of the present invention will become more apparent when considered in view of the following specification and drawing, in which.

Figure 1:
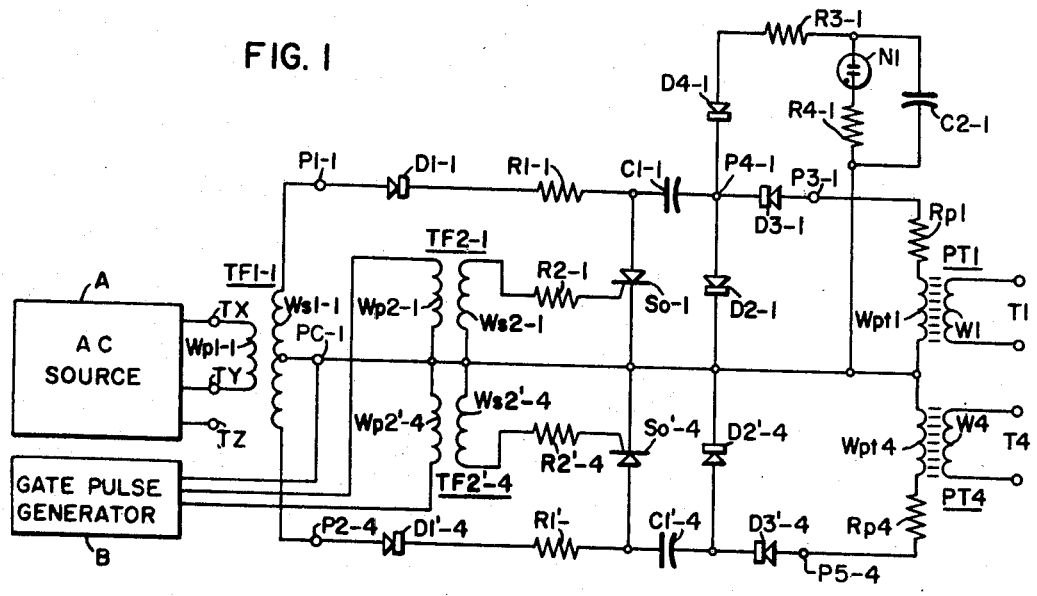
FIGURE 1 is a schematic diagram of a pulse amplifier circuit as utilized herein.
Figure 4:
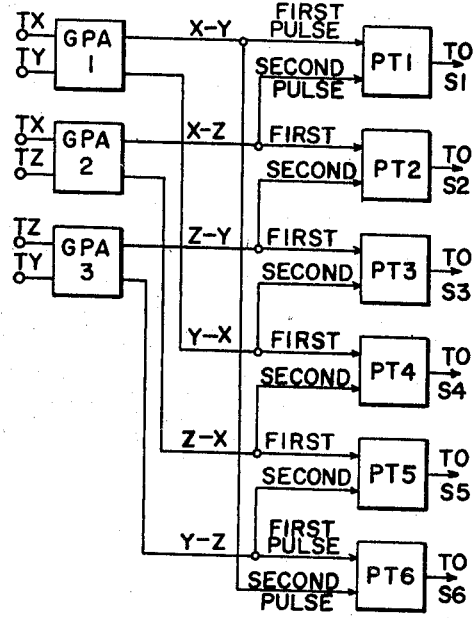

Referring to FIG. 1, a gate pulse amplifier circuit GPA-1 and respective pulse transformers PT1 and PT4 are shown. For three-phase operation two other identical gate pulse amplifiers GPA-2 and GPA-3 as shown in FIG. 4 would be used including respectively pulse transformers PT2 and PT5 and PT3 and PT6. To identify the components used in the respective gate pulse amplifiers the numeral designation of the amplifier is given after the component legend. For example, a diode designated D1-1 would be in GPA-1, while a diode D1-2 would be the analogous diode in GPA-2. The gate amplifier circuit GPA-1 includes two identical and symmetrically connected circuits, the lower portion of the figure being the mirror image of the upper portion. The prime (') indication of the reference characters of the lower half of the circuit identifies the corresponding components appearing in the upper portion of the circuit. For example, the diode D1'-4 would be the mirror component of the diode D1-1 in GPA-1. A three-phase power supply A is provided which supplies a three-phase output voltage at terminals Tx, Ty and Tz. One phase of the output of the AC source A is supplied to the primary winding Wp1-1 of a transformer TF1-1 of the gate pulse amplifier circuit. The transformer TF1-1 has a center tapped secondary winding Ws1-1, which has a center tap at point Pc–1, the outer ends of the secondary winding being designated points P1–1 and P2–4. The point P1–1 is connected to the anode of a diode D1–1 which has its cathode electrode connected to one end of a resistor R1–1. The other end of the resistor R1–1 is connected to the anode of a controlled rectifier So–1. The cathode of the controlled rectifier So–1 is connected to the common point Pc–1 of the transformer TF1–1.

A gating circuit is provided to turn on the controlled rectifier So–1 through the application of pulses to the gate electrode thereof. A gate pulse generator B supplies gating pulses to the primary winding Wp2–1 of a transformer TF2–1 which has a secondary winding Ws2–1. The secondary winding Ws2–1 has one end connected through a resistor R2–1 to the gate electrode of the controlled rectifier So–1. The other end of the winding Ws2–1 is connected to the cathode of the controlled rectifier So–1. Application of pulses from the gate pulse generator B causes a gate turn on signal to be applied to the transformer TF2–1 and so to the gate electrode of the controlled rectifier So–1 which renders it conductive between its anode and cathode electrodes. The pulses supplied by the gate pulse generator B are provided at predetermined times as will be explained in further detail below.

For the purposes of explanation, however, assume that during the half cycle that the point P1–1 of the transformer TF1–1 is positive that the controlled rectifier So–1 is in its turned off, nonconductive state. A capacitor C1–1, which has one end connected to the anode of the controlled rectifier So–1, will therefore charge to the peak value of applied voltage through the diode D1–1, the resistor R1–1 and a diode D2–1, which is connected from the other end of the capacitor C1–1 to the cathode of the controlled rectifier So–1. The resistor R1–1 acts as a current limiting resistor, and the diode D1–1 is so poled to prevent the capacitor C1–1 from discharging therethrough. The voltage developed across the capacitor C1–1 also appears across the anode-cathode circuit of the controlled rectifier So–1. When the controlled rectifier So–1 is gated on, the capacitor C1–1 will have provided a low impedance discharge path through the anode-cathode circuit thereof. It should be noted that gating pulses are provided to the gate electrode of the controlled rectifier So–1 only when the point P1–1 at secondary of the input transformer TF1–1 is at a negative polarity and the diode D1–1 is blocking.

Figure 5:
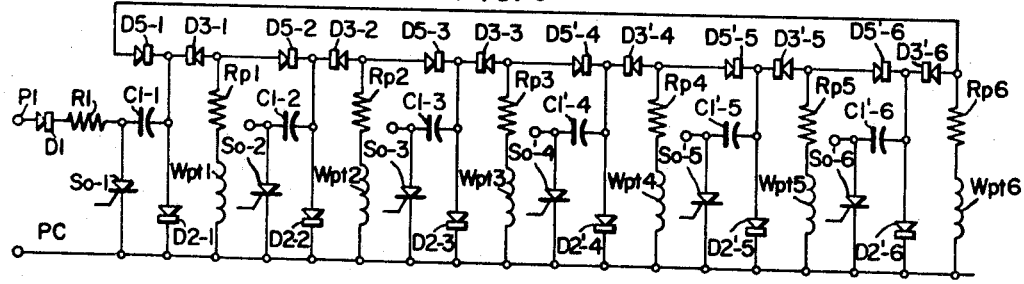
FIGS. 4 and 5 are respectively a block and a schematic diagram showing the connections for three-phase operation of the apparatus of the present invention.

The pulse transformer PT1 has its primary winding Wpt1 connected through a resistor Rp1 to the anode of a diode D3–1 at a circuit point P3–1. The cathode of the diode D3–1 is connected to a junction point P4–1 at the capacitor C1–1. The other end of the primary winding Wpt1 is connected to the common point Pc–1. A series circuit is thus formed including: the primary winding Wpt1, the resistor Rp1 and the diode D3–1. The pulse transformer PT1 has a secondary winding W1 across which is connected a pair of output terminals T1. The mirror image circuit shown in the lower portion of FIG. 1 includes the pulse transformer PT4 having a primary Wpt4 and a secondary winding W4, with output terminals T4 connected thereacross. For three-phase operation, the pulse transformers PT2, PT3, and PT5 and PT6 are provided with the interconnection as shown in FIGS. 4 and 5 to be discussed later and include, respectively, output terminals T2, T3, T5 and T6.

Figure 2:
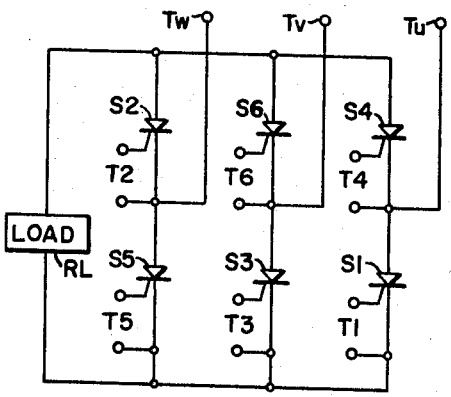
FIG. 2 is a schematic diagram of a three-phase converter bridge circuit as utilized herein.

It will now be shown how the gating pulse waveform is developed across the output terminals T1 through T6. Assume that the capacitor C1–1 has been charged during the positive half cycle when the point P1–1 is positive. Some time during the negative half cycle, assume that a gating pulse is supplied by the gate pulse generator B through the transformer TF2–1 to the gate electrode of the controlled rectifier So–1. The waveform of a pulse supplied to the gate of the controlled rectifier So is shown in curve A of FIG. 3 and is shown to have a time duration of approximately 20 microseconds. The application of this pulse to the controlled rectifier So–1 turns it on which causes the capacitor C1–1 to begin to discharge therethrough passing current from the anode to cathode of the controlled rectifier So. This current will continue to flow as long as it keeps a value above the hold value of the device even though the gating pulse has been removed from the gate electrode thereof. The primary winding of the pulse transformer PT1 being connected to the capacitor C1–1 will have the voltage appearing thereacross transferred thereto. In response to the voltage developed at the primary windings, an output voltage will be developed at the secondary winding W1. This output voltage is utilized as the gating pulses for the converter circuit bridge array, as shown in FIG. 2. The gating waveform is shown in curve B of FIG. 3.

The pulse transformers have magnetic circuits which are so selected to begin to saturate after a predetermined time. Assume in the present example that this time is approximately 100 microseconds. The capacitor C1–1 therefore relatively slowly discharges for approximately the first 100 microseconds of the discharge cycle. It can be seen from curve B of FIG. 3 that the voltage appearing at the output terminals T1, etc., rapidly increases at the beginning of the switching cycle to more than 70% of the maximum output voltage in approximately 1 microsecond. The output voltage then begins to decay during the next approximately 100 microseconds reflecting the nonsaturated condition of the pulse transformers PT1, etc. When, however, the pulse transformer saturates, the capacitor C1–1 quickly discharges and approaches a zero voltage level. The inductance in the pulse transformers PT1, etc. tends to keep the current flowing. The diode D2–1 is connected to one end of the capacitor C1–1 and becomes conductive with the controlled rectifier So–1 turning off when the current therethrough drops below its hold value. The diode D3–1 blocks reverse current flow through the primary windings Wpt1. The pulse transformers are reset due to voltage drops across the diode D3–1, the resistor Rp1 and the diode D2–1. The cycle may then repeat when the point P1 of the transformer TF1 then becomes positive.

Figure 3:
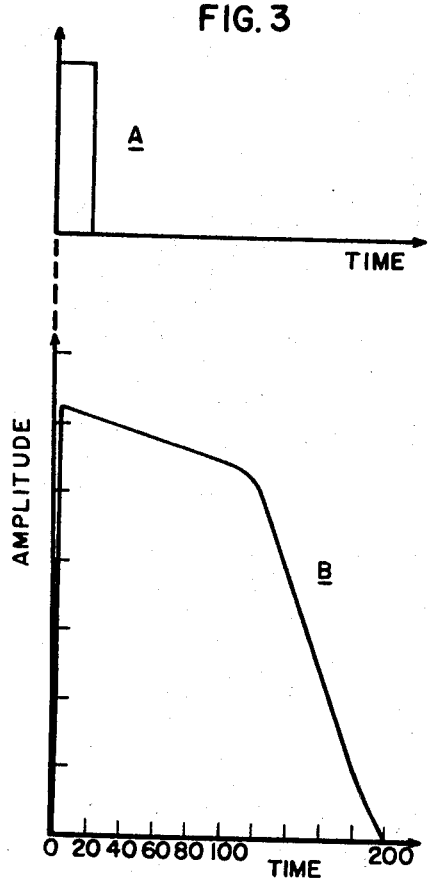
FIG. 3 is a waveform diagram including curves A and B which are utilized herein.

The gating pulse waveform shown in curve B of FIG. 3 has the necessary criterion, as discussed above, of having a rapid rise time to over 70% of the maximum output within one microsecond and then sustaining a relatively high magnitude for a given period of time for high peak energy content and then decaying rather rapidly thereafter. The total pulse duration is approximately 200 microseconds. It should be noted that similar pulses are generated at each of the output terminals T1 through T6. The pulses at the terminal T4 of the mirror image circuit shown at the lower portion of FIG. 1 are generated 180° out of phase from those generated at the terminal T1. The capacitors C1–1 and C1'–4 are, respectively, charged during opposite half cycles and then discharged during the respective opposite half cycles by the application of the pulses from the gate pulse generator B to the gate electrodes of the controlled switches So–1 and So'–1, respectively.

An indicating circuit is shown in FIG. 1 which indicates whether pulses are being supplied to the controlled rectifiers of the bridge array. A separate indicator circuit may be provided for each of the gate pulse amplifiers used, or one indicator circuit may be used, by a switch arrangement, to test each of the six channels providing output gating pulses. The indicator circuit includes a diode D4–1 which has its cathode connected to the junction point P4–1 at the anode of the diode D2–1. The anode of the diode D4–1 is connected to a resistor R3–1, with the other end of the resistor R3–1 connected to one end of a capacitor C2–1. The other end of the capacitor C2–1 is returned to the common point Pc–1 of the transformer TF1–1. Connected across the capacitor C2–1 is a series circuit including a neon bulb N–1 and a resistor R4–1.

The capacitor C2-1 charges through the resistor R3-1 and the diode D4-1 whenever the junction point P4-1 is negative before the controlled rectifier So is gated on. Point P4-1 is driven negative with respect to point Pc-1 when the controlled rectifier So-1 is gated on. When the controlled rectifier So-1 is gated on, the voltage across C1-1 is applied between points P4-1 and Pc-1 charging capacitor C2-1. Capacitor C2-1 will charge when the switch So-1 fires and the diode D2-1 is reverse biased. The neon light will flash when the voltage across capacitor C2-1 exceeds the firing voltage for the neon bulb N-1. When the neon bulb N-1 conducts, its voltage drops due to the current flow through R4-1, and the light extinguishes. The voltage then raises again and the light reflashes. This process continues until the voltage across C2-1 drops below the firing voltage of the neon bulb N-1. This process of rapid turning on and off of the neon bulb results in a glow of the lamp with very small power drain from the gating pulse appearing as a reverse voltage across the diode D2-1. The neon bulb N-1 is thereby illuminated indicating that a gating pulse has been developed in the pulse transformer PT1 of the present example, and the circuit is operating as intended. If no gating pulse were developed in the pulse transformers, the neon bulb would not be illuminated and, therefore, would indicate a malfunction in the development of a gating pulse in the gate pulse amplifier being tested.

FIG. 2 shows a bridge circuit to be used to convert a three-phase alternating waveform applied to the terminals Tu, Tv and Tw into a unidirectional current to be supplied to a load RL. The bridge array includes six legs, each leg including a controlled rectifier S1 through S6. The controlled rectifiers S1, S3 and S5 have their cathode electrodes connected commonly to the positive end of the load RL, while the controlled rectifiers S2, S4 and S6 have their anode electrodes commonly connected to the negative end of the load RL. The terminals Tu, Tv and Tw are connected, respectively, between the common connection of the cathode anode of the controlled rectifiers S4-S1, S6-S3, S2-S5. The vector diagram of the phase relationship of the three-phase source potential applied to the terminals Tu, Tv and Tw is shown in curve A of FIG. 6, while curve B shows the phase relationship of the three-phase voltage applied by the AC source A.

It can be seen from FIG. 2 that in order to supply a complete current path to the load RL two of the controlled rectifiers must be switched on at the same time. For example, if the device S1 is turned on at a given period of time, to complete a current path to the other phase connections Tv or Tw, the device S6 or S2 must be gated on. As shown in FIG. 2, a pair of terminals T1 through T6 is connected respectively between the gate and cathode electrodes of each of the controlled switches S1 through S6. These terminals correspond to the terminals shown in FIG. 1 (T2 and T5 not shown). The waveform as shown in curve B of FIG. 3 is thus applied to gate in the controlled rectifiers S1 through S6 in a predetermined fashion to provide a unidirectional current to the load RL.

In order to assure that a conducting path exists to the load RL under all conditions of operation, it is necessary that the gating pulses applied to the gate electrodes of the controlled rectifier devices S1 through S6 be present over a period of 60° or approximately 3.5 milliseconds for the 60 cycle input. This is not the case in the present example since the waveform shown at curve B of FIG. 3 lasts only approximately 200 milliseconds. Thus, to assure that current is supplied to the load RL under all conditions, it is necessary that a double pulse technique be used. This is, after the first pulse is applied to turn on a given controlled rectifier, a second pulse is applied 60° later to insure its conductivity during the remainder of its desired conduction period. The use of the dual pulse technique permits the use of pulses having a first rise time, high peak energy content, but being of a short time duration. As previously discussed, the high rise time is essential in order to avoid excessive dissipation of energy in the power supply controlled rectifiers S1 through S6. Moreover, the use of the pulses of this wave shape permits the use of less expensive pulse transformers PT1 through PT6 with fewer turns of wire and less magnetic material in the cores thereof. This is possible since it is intended for saturation of the pulse transformers to occur relatively quickly and thereby terminate the gating pulse after a relatively short time duration. If longer duration pulses were used, it would be necessary to use larger pulse transformers having more turns or more magnetic material on both with resulting difficulty in obtaining pulses with the necessary rise time and peak energy content. The use of smaller pulse transformers permits fast rise time pulses and provides a relatively low cost circuit.

For certain applications each leg of the bridge circuit shown in FIG. 2 may contain one or two controlled rectifiers. A pulse transformer is needed for each leg. Two controlled rectifiers are used in series to handle higher leg voltages. When two controlled rectifiers are used in series, two secondaries are supplied on the pulse transformer to provide simultaneous gating of the two series controlled rectifiers. For the larger voltage drives, the bridge circuit as shown in FIG. 2 may be paralleled across the DC load. One three-phase gate pulse amplifier will handle as many as four power supply bridges each with six pulse transformers. In FIG. 1, as many as four pulse transformers with series resistors may be connected between circuit points P3-1 and Pc-1, four between circuit points P5-4 and Pc-1, etc. The gate pulse amplifier must be capable of handling this sort of paralleled loading and still give the required pulse characteristics.

FIGS. 4 and 5 show the interconnection for a three-phase system utilizing a double pulsing technique in which three gate pulse amplifiers GPA-1, GPA-2 and GPA-3 are shown. Each of the gate pulse amplifiers is identical to that shown in FIG. 1, but having the respective input phase connections X-Y, X-Z, Z-Y applied thereto.

Figure 7:
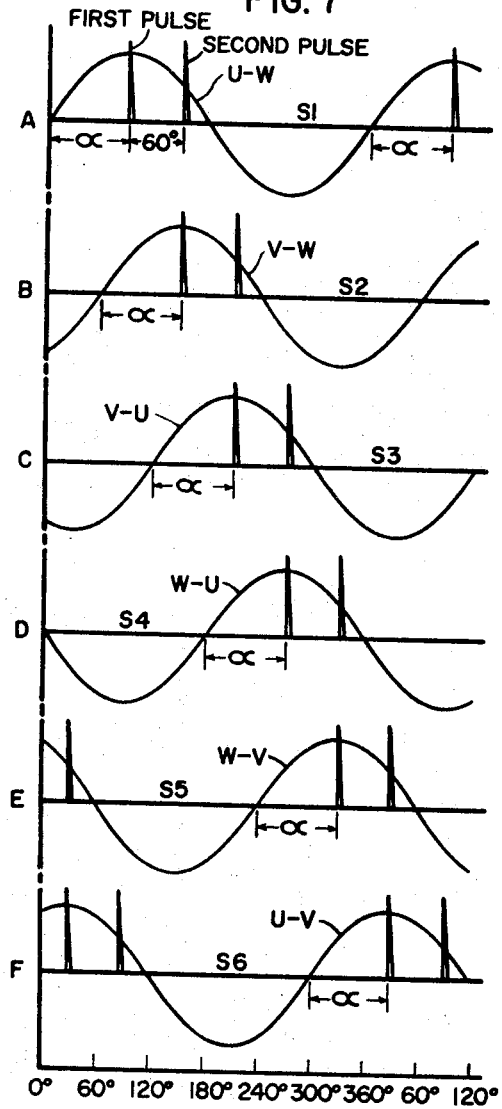
FIG. 7 is a waveform diagram including curves A through F showing the phase and gating pulse relationship as used herein.

FIG. 7 shows a waveform diagram of the relationships of the UVW phases and the gating pulses applied to the respective controlled rectifiers S1 through S6. As can be seen from curves A and B of FIG. 6, the U-W waveform is in phase with the X-Y waveform; the V-W waveform is in phase with the X-Z waveform and the U-V waveform is in phase with the Z-Y waveform.

The first gating pulse applied to a given one of the controlled rectifiers S1 through S6 is applied thereto after a predetermined time delay α as shown in each of the curves A through F of FIG. 7. The time delay α is determined by the gate pulse generator B which is operative to supply a pulse to the controlled rectifiers of each of the gate pulse amplifiers at a predetermined time. A gate pulse generator B capable of supplying the desired gating pulses to the controlled rectifiers such as So is disclosed in copending application Ser. No. 518,325, filed Jan. 3, 1966, by R. E. Hull et al. and assigned to the same assignee as the present application. It should be noted, however, that any type of pulse generator capable of supplying a waveform such as shown in curve A of FIG. 3 at the desired time intervals can be utilized with the apparatus as disclosed herein.

Figure 6:
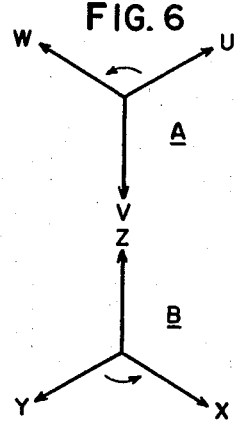
FIG. 6 is a vector diagram including curves A and B showing the phase relationship of AC waveforms as utilized herein.

Referring to FIGS. 4, 5 and 6, the method by which the double pulse technique is applied to the bridge circuit of FIG. 2 will be explained. In curve A of FIG. 7, a first pulse is generated by the gating on of the device So-1 and is applied to the primary winding Wpt1 of the pulse transformer PT1 from the X-Y output of GPA-1. A diode D5-1 is connected from cathode to anode between the capacitor C1-1 and the resistor Rp6 and blocks reverse discharge through the winding Wpt6. As is shown in curve F of FIG. 7, the X-Y output of GPA-1 is also supplied to the primary winding Wpt6 of the pulse transformer PT6 of GPA-3 as the second pulse instigated by the gating of the switch So-1, the return path to capacitor C1-1 being supplied by the diode D5-1 connected to the resistor Rp6. In curve of A of FIG. 7, the second pulse is applied to the primary winding Wpt1 of the pulse transformer PT1 at a time 60° later than the application of the first pulse by the gating on of the switch So-2 of GPA-2. The second pulse to the pulse transformer PT1 is supplied by GPA-2 through the X-Z output which is connected to the pulse transformer PT1. The return path for the discharge of capacitor C1-2 through the winding Wpt1 is through a diode D5-2 connected between the capacitor C1-2 and the resistor Rp1. The X-Z output of GPA-2 also supplies the first pulse to the primary winding Wpt2 of the pulse transformer PT2, as shown in curve B of FIG. 7. The second pulse to the primary winding Wpt2 of the pulse transformer PT2 is supplied by the Z-Y output of GPA-3 at a time 60° later than the application of the first pulse to the pulse transformer PT2 by the gating on of the switch So-3 of the GPA-3, a discharge path for the capacitor C1-3 through the winding Wpt2 being provided by a diode D5-3 connected between C1-3 and resistor Rp2. The Z-Y output is also supplied to the primary winding Wpt3 of the pulse transformer PT-3 as its first pulse, see curve C of FIG. 7.

After a time 60° from the application of the first pulse to the pulse transformer PT3, a second pulse is applied to the winding Wpt3 from the Y-X output of GPA-1 by the gating on of the device So'-4 and the discharge of capacitor C1-4. A diode D5'-4 provides the return path through the winding Wpt3 being connected between the capacitor C1-4 and the resistor Rp3. The Y-X output is also applied to the primary winding Wpt4 of the pulse transformer PT4 as the first pulse thereto, see curve D of FIG. 7. The second pulse to the primary winding Wpt4 of the pulse transformer PT4 is supplied by the Z-X output of GPA-2 which is initiated by the gating on of the switch So'-5. A diode D5'-5 provides a return path through the winding Wpt4 being connected through capacitor C1'-5 and resistor Rp4. This output also supplies the first pulse to the primary winding Wpt5 of the pulse transformer PT5 as shown in curve E of FIG. 7. The second pulse to the pulse transformer PT5 is supplied by the Y-Z output of GPA-3, which occurs 60° after the application of the first pulse thereto and is generated by the gating on of the controlled rectifiers So'-6. A diode D5'-6 is connected between the resistor Rp5 and the capacitor C1'-6 to permit the pulsing of the winding Wpt5 at this time. The Y-Z output of GPA-3 also operates as the first pulse to the pulse transformer PT6, see curve F, FIG. 7, the second pulse being supplied by the X-Y output of GPA-1 to complete one complete cycle of operation.

It should be noted that the respective outputs X-Y and Y-X; X-Z and Z-X; and Z-Y and Y-Z of each of the gate pulse amplifiers GPA-1, GPA-2 and GPA-3 are 180° apart in time. Thus, the first and second pulses applied to the pulse transformer PT4 occur 180° later than do those applied to the pulse transformer PT1. Similarly, the first and second pulses applied to the pulse transformers PT5 and PT6 respectively occur 180° after those applied to the pulse transformers PT2 and PT3, respectively. It can thus be seen that the three pulse amplifiers can be connected with the six pulse transformers PT1 through PT6 to provide output pulses to be supplied to the respective controlled rectifiers S1 through S6 of the brigde circuit, as shown in FIG. 2, which will permit the sequential operation of the controlled rectifiers thereof, so that, two of the devices will be in their conductive state during a given 60° portion of the input voltage cycle. This will then permit unidirectional current to be supplied to the load RL as desired for the proper operation of the AC to DC bridge converter circuit of FIG. 2. As previously discussed, the waveform of the gating pulse supplied to the individual controlled rectifiers S1 through S6 is shown in curve B of FIG. 3 and has such a characteristic to minimize power dissipation in each of the devices. Moreover, the use of the relatively short time duration pulses and the double pulse technique permit economy in design of the pulse transformers PT1 through PT6.

Although the present invention has been described with certain degrees of particularity, it should be understood that the present disclosure has been made only by way of example and that numerous changes in the details and construction and the combination and arrangement of parts, elements and compartments can be resorted to without departing from the scope and spirit of the present invention.

We claim as our invention:

1. In power supply control circuitry including controlled switching devices, the combination of: a pulse amplifier circuit responsive to alternating input and switching signals for generating amplifier pulses, said pulse amplifier circuit including a capacitive element to be charged during predetermined times with respect to said input alternating signals, a unidirectional device operatively connected to said capacitive element to maintain the charge thereon while desired, and a switching device operatively connected to said capacitive element for discharging said capacitive element in response to said switching signals being applied thereto and thereby generate said amplifier pulses; and a pulse transformer for receiving the amplifier pulses generated by said pulse amplifier circuit and applying in response thereto gating pulses to said controlled switching devices, said pulse transformer being of such a design to develop gating pulses having a fast rise time and to saturate after a predetermined time to determine the time duration of said gating pulses.

2. The combination of claim 1 wherein said gate controlled switching devices and said switching device comprise controlled rectifiers.

3. The combination of claim 1 wherein another unidirectional device is operatively connected between said capacitive element and said pulse transformer to permit said switching device to turn off when said capacitive element has discharged to a predetermined level.

4. The combination of claim 3 wherein said pulse transformer includes a primary winding operatively connected to said capacitive element so as to have applied thereto said amplifier pulses when said switching device is turned on and a secondary winding operatively connected to said controlled switching devices for applying said gating pulses thereto.

5. The combination of claim 2 including another pulse amplifier circuit which is a mirror image circuit of said pulse amplifier circuit, and further including a corresponding pulse transformer to provide gating pulses on opposite half cycles from those provided by said pulse amplifier circuit.

6. In the power supply control circuitry of claim 5 wherein a polyphase voltage is to be converted into direct current by a bridge array of said controlled switching devices and wherein said input alternating signals comprise a polyphase voltage, the combination further including: the number of pulse amplifier and the mirror image circuits thereof and the corresponding pulse transformer equal to the number of phases of the polyphase voltages, each of the pulse amplifier and mirror image circuits thereof receiving one phase of the polyphase input alternating signals.

7. The combination of claim 6 wherein said pulse amplifier and mirror image circuits thereof are so connected and arranged to apply at least two gating pulses having a predetermined time spacing therebetween to each of said controlled rectifier devices of said bridge array to ensure that each of said controlled rectifier devices is maintained in a conductive state during a given time interval.

8. The combination of claim 7 wherein the time spacing between said gating pulses is approximately 60° of the cycle of said polyphase voltage to be converted.

References Cited

UNITED STATES PATENTS 2,823,319 2/1958 Vossberg _____ 307—108 X
3,296,551 1/1967 Staples _____ 328—65 X JOHN F. COUCH, *Primary Examiner.*

W. H. BEHA, JR., *Assistant Examiner.*